(12) United States Patent
Kageyama et al.

(10) Patent No.: US 10,948,337 B2
(45) Date of Patent: Mar. 16, 2021

(54) CONTROL DEVICE FOR SETTING PARAMETERS OF COMBINATION WEIGHING APPARATUSES, COMBINATION WEIGHING APPARATUS, AND COMBINATION WEIGHING APPARATUS SYSTEM UTILIZING SUCH CONTROL DEVICE

(71) Applicant: Ishida Co., Ltd., Kyoto (JP)

(72) Inventors: Toshiharu Kageyama, Ritto (JP); Shinya Ikeda, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 224 days.

(21) Appl. No.: 16/069,190

(22) PCT Filed: Jan. 10, 2017

(86) PCT No.: PCT/JP2017/000486
§ 371 (c)(1),
(2) Date: Jul. 11, 2018

(87) PCT Pub. No.: WO2017/122636
PCT Pub. Date: Jul. 20, 2017

(65) Prior Publication Data
US 2018/0356280 A1    Dec. 13, 2018

(30) Foreign Application Priority Data

Jan. 14, 2016    (JP) .............................. JP2016-005316

(51) Int. Cl.
*G01G 19/393* (2006.01)
(52) U.S. Cl.
CPC .................................. *G01G 19/393* (2013.01)
(58) Field of Classification Search
CPC .................................................. G01G 19/393
See application file for complete search history.

(56) References Cited

U.S. PATENT DOCUMENTS 4,553,616 A * 11/1985 Haze .................... G01G 19/393
177/1
4,811,256 A * 3/1989 Yamada ................. G01G 13/16
177/25.18

(Continued)

FOREIGN PATENT DOCUMENTS

JP    H05-288596 A    11/1993
JP    H06-174539 A     6/1994

(Continued)

OTHER PUBLICATIONS

Computer translation of JP-2011-257159 (Yamato) downloaded from the JPO website on Apr. 16, 2020.*

(Continued)

*Primary Examiner* — Randy W Gibson
(74) *Attorney, Agent, or Firm* — Studebaker & Brackett PC

(57) ABSTRACT

A control device for combination weighing apparatuses includes: an acquisition unit capable of acquiring, from a plurality of combination weighing apparatuses, parameters relating to combination weighing that are set for the combination weighing apparatuses; and a controller configured to collect the parameters from the combination weighing apparatuses from which acquiring the parameters via the acquisition unit is possible, to generate, based on the collected parameters, setting parameters to set for some of the combination weighing apparatuses among the combination weighing apparatuses from which acquiring via the acquisition unit is possible, and to transmit the setting parameters to some of the combination weighing apparatuses from which acquiring via the acquisition unit is possible.

18 Claims, 5 Drawing Sheets

(56) References Cited

U.S. PATENT DOCUMENTS

| | | | | |
|---|---|---|---|---|
| 4,840,240 A | * | 6/1989 | Toyoda | G01G 13/242 177/1 |
| 4,967,383 A | * | 10/1990 | Hirano | G01G 19/393 177/25.15 |
| 5,084,832 A | * | 1/1992 | Yamada | G01G 13/16 177/25.18 |
| 2003/0205413 A1 | | 11/2003 | Gesuita et al. | |

FOREIGN PATENT DOCUMENTS

| | | |
|---|---|---|
| JP | 2001-243074 A | 9/2001 |
| JP | 2002-326603 A | 11/2002 |
| JP | 2002-350367 A | 12/2002 |
| JP | 2004-191234 A | 7/2004 |
| JP | 2005-121512 A | 5/2005 |
| JP | 2010-164545 A | 7/2010 |
| JP | 2011-257159 A | 12/2011 |
| JP | 2012-173197 A | 9/2012 |

OTHER PUBLICATIONS

Computer translation of JP-06-174539 (Ishida) downloaded from the JPO website on Apr. 17, 2020.*

Computer translation of JP-2004-191234 (Ishida) downloaded from the JPO website on Apr. 17, 2020.*

International Search Report issued in corresponding International Application No. PCT/JP2017/000486; dated Mar. 21, 2017.

International Preliminary Report on Patentability issued in corresponding International Application No. PCT/JP2017/000486; dated Jul. 26, 2018.

An Office Action mailed by the Japanese Patent Office dated Feb. 5, 2019, which corresponds to Japanese Patent Application No. 2017-561110 and is related to U.S. Appl. No. 16/069,190.

An Office Action; "Notice of Reasons for Refusal," mailed by the Japanese Patent Office dated Oct. 20, 2020, which corresponds to Japanese Patent Application No. 2019-131232 and is related to U.S. Appl. No. 16/069,190 with English language translation.

* cited by examiner

CONTROL DEVICE FOR SETTING PARAMETERS OF COMBINATION WEIGHING APPARATUSES, COMBINATION WEIGHING APPARATUS, AND COMBINATION WEIGHING APPARATUS SYSTEM UTILIZING SUCH CONTROL DEVICE

TECHNICAL FIELD

One aspect of the present disclosure relates to a control device for combination weighing apparatuses, a combination weighing apparatus, and a combination weighing apparatus system.

BACKGROUND ART

A combination weighing apparatus measuring off articles such as confectionery and fruit having variations in individual weight so that a total weight falls within a tolerable range has been known. This combination weighing apparatus is provided with a plurality of heads having a radial feeder that conveys the articles by vibration and having a weighing hopper that holds and weighs the articles discharged from the radial feeder. Then, the combination weighing apparatus calculates combinations of mass weighed by each of the weighing hoppers and, from the result thereof, selects the weighing hoppers to discharge the articles.

The combination weighing apparatus, as illustrated in Patent Literature 1 for example, determines various parameters relating to combination weighing such as vibration time and vibration intensity in the radiation feeder, and opening-and-closing time of the gate of the weighing hopper. Furthermore, in the combination weighing apparatus, by a worker (operator) and the like, various parameters are input via an operating unit provided on each combination weighing apparatus.

CITATION LIST

Patent Literature

Patent Literature 1: Japanese Unexamined Patent Publication No. 2005-121512

SUMMARY OF INVENTION

Technical Problem

As for the above-described combination weighing apparatus, for example, two or more of the combination weighing apparatuses are often installed, and are often arranged being spaced apart from each other in a factory or the like. Because of this, the task of setting the above-described parameters for each combination weighing apparatus is burdensome for the worker and the like and lacks convenience.

An object of one aspect of the present disclosure is to provide a control device for combination weighing apparatuses, a combination weighing apparatus, and a combination weighing apparatus system capable of improving the convenience of the worker in setting the parameters relating to combination weighing for a plurality of combination weighing apparatuses.

Solution to Problem

A control device for combination weighing apparatuses according to one aspect of the present disclosure includes: an acquisition unit capable of acquiring, from a plurality of combination weighing apparatuses, parameters relating to combination weighing that are set for the combination weighing apparatuses; and a controller configured to collect the parameters from the combination weighing apparatuses from which acquiring the parameters via the acquisition unit is possible, to generate, based on the collected parameters, setting parameters to set for some of the combination weighing apparatuses among the combination weighing apparatuses from which acquiring via the acquisition unit is possible, and to transmit the setting parameters to some of the combination weighing apparatuses from which acquiring via the acquisition unit is possible.

The control device for combination weighing apparatuses of this configuration, when the parameters are set for at least one combination weighing apparatus, automatically collects the parameters, determines the setting parameters, and causes the combination weighing apparatuses to set the setting parameters. Accordingly, the worker can save time and effort for going to and setting the parameters to the individual combination weighing apparatus's. As a result, it is possible to improve the convenience of the worker in setting the parameters relating to combination weighing for the combination weighing apparatuses.

In the control device for combination weighing apparatuses in one aspect of the present disclosure, the acquisition unit may be a communication unit capable of performing communication with the combination weighing apparatuses, and the controller may collect the parameters relating to combination weighing that are set for the combination weighing apparatuses from the combination weighing apparatuses that are able to perform communication via the communication unit, may generate, based on the collected parameters, setting parameters to set for some of the combination weighing apparatuses among the combination weighing apparatuses that are able to perform communication via the communication unit, and may transmit the setting parameters to some of the combination weighing apparatuses that are able to perform communication via the communication unit.

In the control device for combination weighing apparatuses of this configuration, because it is possible to exchange the parameters with the combination weighing apparatuses that are able to perform communication via the communication unit, it is possible to further improve the convenience of the worker in setting the parameters relating to combination weighing for the combination weighing apparatuses.

A control device for combination weighing apparatuses according to one aspect of the present disclosure includes: an acquisition unit capable of acquiring, from a plurality of combination weighing apparatuses, parameters relating to combination weighing that are set for the combination weighing apparatuses; a receiving unit configured to receive parameters relating to combination weighing for a specific combination weighing apparatus among the combination weighing apparatuses from which acquiring the parameters via the acquisition unit is possible; and a controller configured to generate, based on the parameters received via the receiving unit, setting parameters to set for the combination weighing apparatuses from which acquiring via the acquisition unit is possible, for other combination weighing apparatuses different from the specific combination weighing apparatus, and to transmit the setting parameters to the other combination weighing apparatuses.

The control device for combination weighing apparatuses of this configuration receives the parameters for the specific combination weighing apparatus via the receiving unit of the control device. Subsequently, when the parameters are determined to be the setting parameters, the control device causes the other combination weighing apparatuses different from the specific combination weighing apparatus to set the setting parameters. Accordingly, the worker can save time and effort for going to and setting the parameters to the individual combination weighing apparatuses. As a result, it is possible to improve the convenience of the worker in setting the parameters relating to combination weighing for the combination weighing apparatuses.

In the control device for combination weighing apparatuses in one aspect of the present disclosure, the acquisition unit may be a communication unit configured to perform communication with a plurality of combination weighing apparatuses, the receiving unit may receive the parameters relating to combination weighing for a specific combination weighing apparatus among the combination weighing apparatuses that are able to perform communication via the communication unit, and the controller may determine, based on the parameters received via the receiving unit, the setting parameters to set for the combination weighing apparatuses being able to perform communication via the communication unit for other combination weighing apparatuses different from the specific combination weighing apparatus, and may transmit the setting parameters to the other combination weighing apparatuses.

In the control device for combination weighing apparatuses of this configuration, because it is possible to exchange the parameters with the combination weighing apparatuses that are able to perform communication via the communication unit, it is possible to further improve the convenience of the worker in setting the parameters relating to combination weighing for the combination weighing apparatuses.

In the control device for combination weighing apparatuses in one aspect of the present disclosure, the controller may acquire, from the combination weighing apparatuses from which acquiring the parameters via the acquisition unit is possible, operating rate information indicating an operating rate that is a ratio of the number of times the combination weighing was established to the number of times the combination weighing was executed, and may determine, with the operating rate as a criterion, whether to adopt the parameter of a combination weighing apparatus operating at a predetermined operating rate as a candidate for the setting parameters.

The control device for combination weighing apparatuses of this configuration collects not only the parameters but also the operating rate from the combination weighing apparatuses that are able to perform communication via the communication unit. Accordingly, the control device can determine, based on the operating rate that serves as an index of the quality of the parameters, whether to adopt the parameter from the collected parameters as a candidate for the setting parameters.

In the control device for combination weighing apparatuses in one aspect of the present disclosure, the controller may adopt, in preference to a parameter acquired from a combination weighing apparatus for which the operating rate is a first value, a parameter acquired from a combination weighing apparatus for which the operating rate is a second value higher than the first value, as a candidate for the setting parameters.

The control device for combination weighing apparatuses of this configuration, when having acquired a plurality of parameters, adopts the parameter that can achieve a relatively high operating rate as a candidate for the setting parameters. Accordingly, the control device can set, as the setting parameters, the parameter of the combination weighing apparatus that can achieve a high operating rate. As a result, it is possible to further increase the operating rate of the combination weighing apparatuses that are able to perform communication with one another via the communication unit. That is, it is possible to improve the processing capacity of the combination weighing apparatuses that are able to perform communication with one another via the communication unit.

In the control device for combination weighing apparatuses in one aspect of the present disclosure, the controller may adopt a parameter acquired from a combination weighing apparatus for which the operating rate is greater than a third value that is a predetermined threshold value, as a candidate for the setting parameters.

The control device for combination weighing apparatuses of this configuration sets, as a candidate for the setting parameters, only the parameter of the combination weighing apparatus that can achieve the operating rate at a certain level or higher. As a result, the operating rate of the combination weighing apparatuses that are able to perform communication with one another via the communication unit can be increased to a certain value or greater. That is, the processing capacity of the combination weighing apparatuses that are able to perform communication with one another via the communication unit can be maintained at a certain level or higher.

In the control device for combination weighing apparatuses in one aspect of the present disclosure, the controller may acquire, from the specific combination weighing apparatus, operating rate information indicating an operating rate that is a ratio of the number of times the combination weighing was established to the number of times the combination weighing was executed, and may determine, based on the acquired operating rate, whether to adopt the parameter as a candidate for the setting parameters.

The control device for combination weighing apparatuses of this configuration collects not only the parameters but also the operating rate from the combination weighing apparatuses that are able to perform communication via the communication unit. Accordingly, the control device can determine, based on the operating rate that serves as an index of the quality of the parameters, whether to adopt the parameter from the collected parameters as a candidate for the setting parameters.

In the control device for combination weighing apparatuses in one aspect of the present disclosure, when the operating rate acquired from the specific combination weighing apparatus is greater than a predetermined value, the controller may adopt the parameter as a candidate for the setting parameters.

The control device for combination weighing apparatuses of this configuration sets, as a candidate for the setting parameters, only the parameter of the combination weighing apparatus that can achieve the operating rate at a certain level or higher. As a result, the operating rate of the combination weighing apparatuses that are able to perform communication with one another via the communication unit can be increased to a certain value or greater. That is, the control device can maintain at a certain level or higher the processing capacity of the combination weighing apparatuses that are able to perform communication with one another via the communication unit.

In the control device for combination weighing apparatuses in one aspect of the present disclosure, each of the combination weighing apparatuses may determine the parameter to set for the combination weighing apparatus by using a change tendency of the parameter generated based on the parameters having been set for the combination weighing apparatus in the past, and the controller may acquire, from the combination weighing apparatuses from which acquiring the parameters via the acquisition unit is possible, numerical information concerning the number of the parameters used in generating the change tendency of the parameter, and may determine, with the acquired numerical information as a criterion, whether to adopt the parameter of the combination weighing apparatus corresponding to the numerical information as a candidate for the setting parameters.

In the control device for combination weighing apparatuses of this configuration, when updating parameters relating to combination weighing in performing some control by a control method that uses the change tendency of the parameter generated based on the parameters having been set for the combination weighing apparatus in the past, that is, by what is called learning control, it is known that a parameter updated based on a larger number of the parameters can obtain the operation closer to a target. In other words, the parameter updated by deeper learning can be said to be a parameter of higher accuracy. In the control device for combination weighing apparatuses of this configuration, it is possible to determine, based on the operating rate that serves as an index of the quality of the parameters, whether to adopt the parameter from the collected parameters as a candidate for the setting parameters.

In the control device for combination weighing apparatuses in one aspect of the present disclosure, the controller may acquire, from the combination weighing apparatuses from which acquiring the parameters via the acquisition unit is possible, supply information based on a target supply amount W to be set for a hopper that each of the combination weighing apparatuses includes and a supply amount W1 of articles actually put into the hopper and, when it is determined, based on the acquired supply information, that deviation between the target supply amount W and the supply amount W1 is within a predetermined threshold value, may adopt, as a candidate for the setting parameters, the parameter of the combination weighing apparatus that is the acquisition source of the supply information served as a subject of the determination.

It is empirically known that, when the articles of a target supply amount are supplied to a hopper that is weighed by the weighing unit, the operating rate increases. That is, the operating rate can be further increased as the degree of deviation between the target supply amount W and the supply amount W1 is made smaller. The control device for combination weighing apparatuses of this configuration can determine, based on the operating rate that serves as an index of the quality of the parameters, whether to adopt the parameter from the collected parameters as a candidate for the setting parameters.

A combination weighing apparatus according to one aspect of the present disclosure includes: a conveying unit configured to convey articles; a plurality of hoppers configured to temporarily store therein the articles conveyed by the conveying unit; a weighing unit configured to weigh a measured value corresponding to a mass of the articles stored in the hopper; a weighing controller configured to select a combination of the measured values from a plurality of the measured values that are weighed by the weighing unit and associated with the hoppers such that a total value yields a target measured value, and to cause the hoppers that are associated with the combination to discharge the articles; and the above-described control device for combination weighing apparatuses.

The combination weighing apparatus of this configuration, when the parameters are set for at least one combination weighing apparatus connected via the communication unit, automatically collects the parameters, determines the setting parameters, and causes the combination weighing apparatuses to set the setting parameters. Accordingly, the worker can save time and effort for going to and setting the parameters to the individual combination weighing apparatuses. As a result, it is possible to improve the convenience of the worker in setting the parameters relating to combination weighing for the combination weighing apparatuses.

A combination weighing apparatus system according to one aspect of the present disclosure includes a plurality of combination weighing apparatuses, and the above-described control device for combination weighing apparatuses, and each of the combination weighing apparatuses includes a conveying unit configured to convey articles, a plurality of hoppers configured to temporarily store therein the articles conveyed by the conveying unit, a weighing unit configured to weigh a measured value corresponding to a mass of the articles stored in the hopper, and a weighing controller configured to select a combination of the measured values from a plurality of the measured values that are weighed by the weighing unit and associated with the hoppers such that a total value yields a target measured value and to cause the hoppers that are associated with the combination to discharge the articles.

The combination weighing apparatus system of this configuration, when the parameters are set for at least one combination weighing apparatus connected to the control device for combination weighing apparatuses, automatically collects the parameters, determines the setting parameters, and causes the combination weighing apparatuses to set the setting parameters. Accordingly, the worker can save time and effort for going to and setting the parameters to the individual combination weighing apparatuses. As a result, it is possible to improve the convenience of the worker in setting the parameters relating to combination weighing for the combination weighing apparatuses.

Advantageous Effects of Invention

According to one aspect of the present disclosure, it is possible to improve the convenience of the worker in setting the parameters relating to combination weighing for the combination weighing apparatuses.

DESCRIPTION OF EMBODIMENT

With reference to the accompanying drawings, the following describes an exemplary embodiment. In the description of the drawings, identical constituent elements are denoted by identical reference signs, and redundant explanations are omitted.

Figure 1:
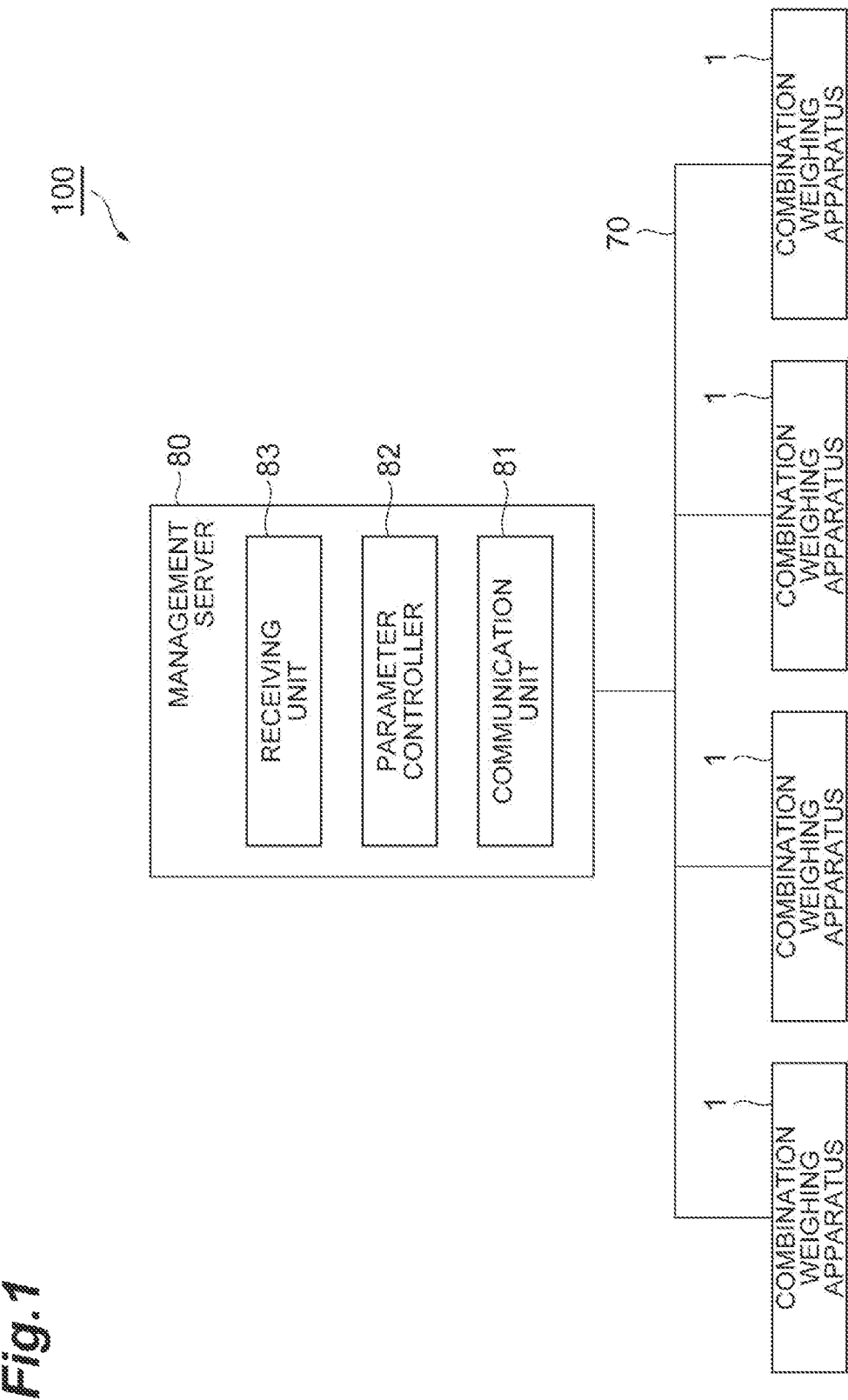
FIG. 1 is a diagram schematically illustrating a configuration of a combination weighing apparatus system according to one embodiment.

As illustrated in FIG. 1, a combination weighing system 100 is provided with a plurality of combination weighing apparatuses 1, and a management server (a control device for combination weighing apparatuses) 80. The management server 80 and the combination weighing apparatuses 1 are communicatively connected with one another via a wired or wireless local area network (LAN) 70. In the following description, the combination weighing system 100 in which the plurality of combination weighing apparatuses 1 arranged in a factory are managed by the management server 80 deployed in a management room and the like in the factory will be explained as an example.

Figure 2:
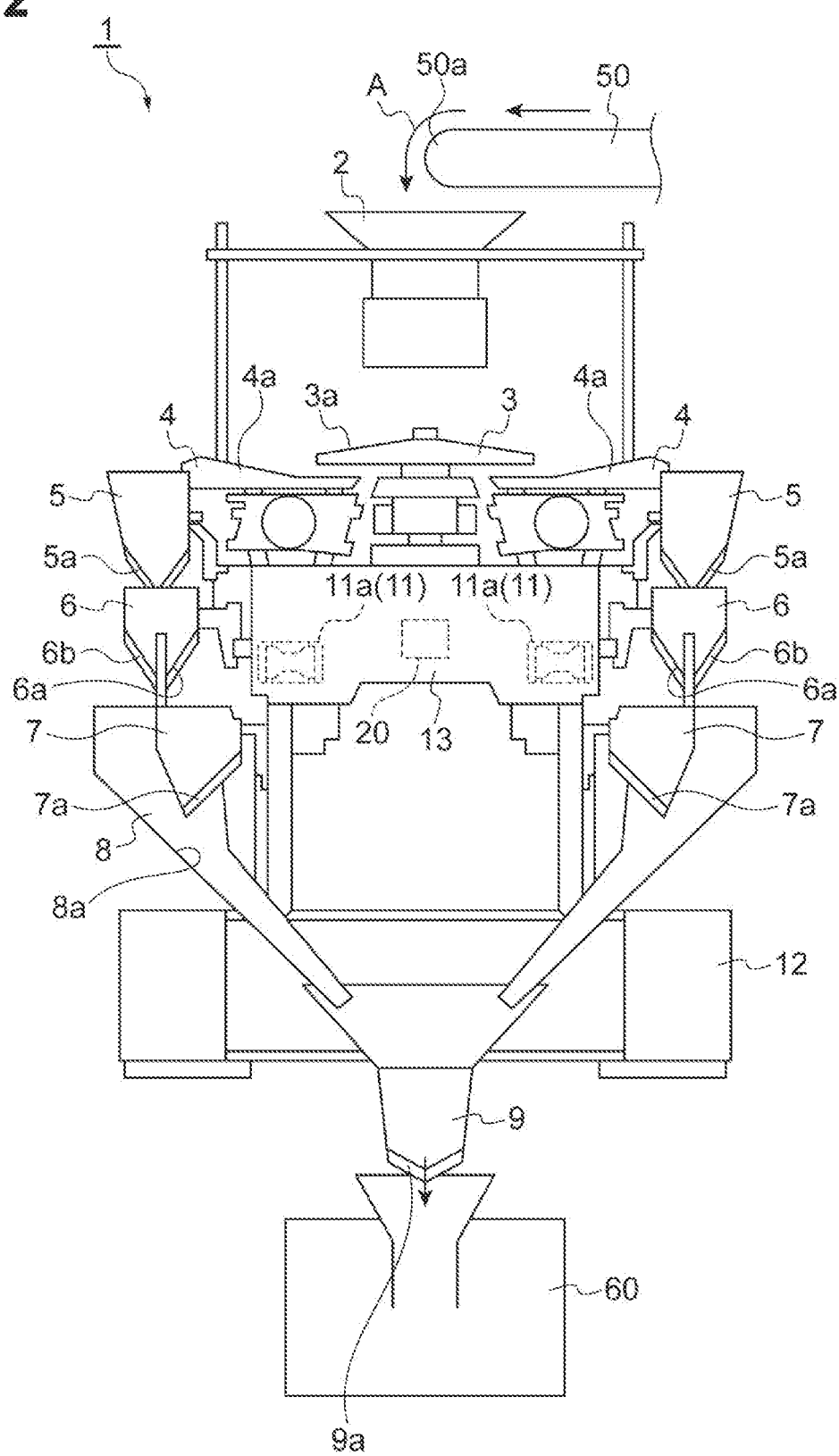
FIG. 2 is a diagram illustrating a configuration of a combination weighing apparatus included in FIG. 1.

As illustrated in FIG. 2, the combination weighing apparatus 1 includes an input chute 2, a distributing feeder (a conveying unit) 3, a plurality of radial feeders (conveying units) 4, distance measuring sensors 45 (see FIG. 3), a plurality of pool hoppers 5, a plurality of weighing hoppers (hoppers) 6, a plurality of booster hoppers (hoppers) 7, a collecting chute 8, a timing hopper 9, a weighing unit 11, and a weighing controller 20. The combination weighing apparatus 1 measures off articles A, which are supplied by a conveyor 50, to a target measured value and supplies the articles A to a bag-making and packaging machine 60. The articles A are articles that have variations in single body mass such as agricultural products, fishery products, and processed food. The bag-making and packaging machine 60 packages the articles A weighed and supplied by the combination weighing apparatus 1 while forming a film into a bag of a predetermined capacity.

The input chute 2 is arranged below a conveying end 50a of the conveyor 50. The input chute 2 receives the articles A fallen from the conveying end 50a of the conveyor 50 and discharges the articles A downward.

The distributing feeder 3 is arranged below the input chute 2. The distributing feeder 3 includes a conveying surface 3a having a conical shape expanding downward. The distributing feeder 3 vibrates the conveying surface 3a, thereby uniformly conveying the articles A discharged on an apex portion of the conveying surface 3a from the input chute 2 toward the outer edge of the conveying surface 3a.

The radial feeders 4 are radially arranged along the outer edge of the conveying surface 3a of the distributing feeder 3. Each radial feeder 4 includes a trough 4a extending outward from the lower portion of the outer edge of the conveying surface 3a. Each radial feeder 4 vibrates the trough 4a, thereby conveying the articles A discharged from the outer edge of the conveying surface 3a toward a distal end portion of the trough 4a.

Figure 3:
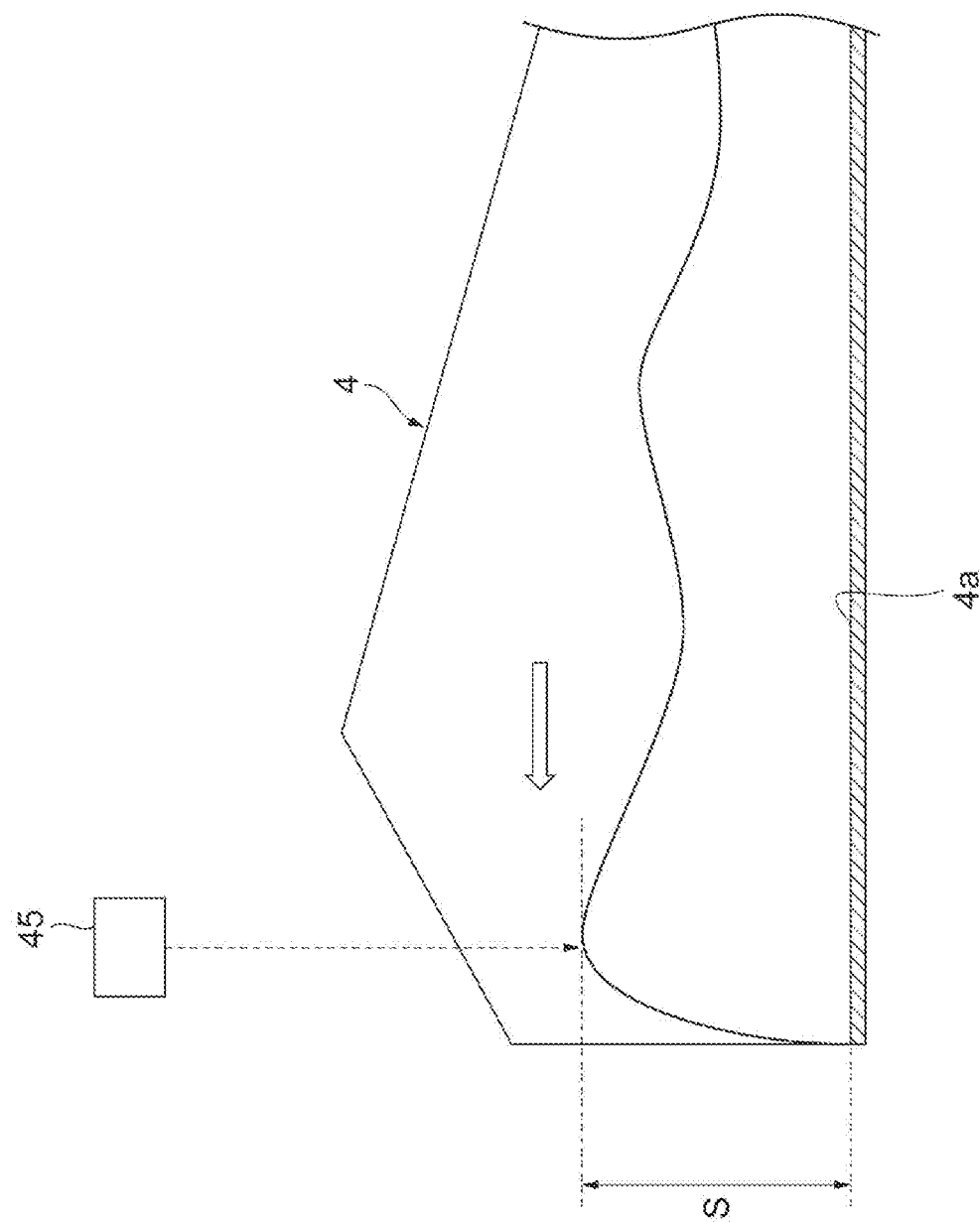
FIG. 3 is a block diagram illustrating a functional configuration of the combination weighing apparatus system.

Above each of the radial feeders 4, the distance measuring sensors 45 are arranged corresponding to the respective radial feeders 4. The distance measuring sensor 45 detects a distance between the distance measuring sensor 45 and the articles on the radial feeder 4. The distance measuring sensor 45, for example, irradiates the articles A with light and receives the light reflected by the articles A, thereby obtaining the distance between the distance measuring sensor 45 and the articles. As illustrated in FIG. 3, the distance measuring sensor 45 detects the distance to the articles A located near the discharging end of the radial feeder 4. The distance measuring sensor 45 outputs to the weighing controller 20 a detection signal that indicates the distance up to the detected articles A. In the weighing controller 20, based on the difference between the distance to the distance measuring sensor 45 from the bottom surface of the trough 4a of the radial feeder 4 and the distance that the detection signal indicates, converting it into a layer thickness S of the articles A is performed.

Referring back to FIG. 2, each pool hopper 5 is arranged below the distal end portion of the trough 4a of the respective radial feeders 4. Each pool hopper 5 includes a gate 5a that can be opened and closed with respect to the bottom portion thereof. Each pool hopper 5, by closing the gate 5a, temporarily stores therein the articles A discharged from distal end portion of the trough 4a corresponding thereto. Moreover, each pool hopper 5, by opening the gate 5a, discharges downward the articles A that have been temporarily stored.

Each weighing hopper 6 is arranged below the gate 5a of the respective pool hoppers 5. Each weighing hopper 6 includes a gate 6a and a gate 6b that can be opened and closed with respect to the bottom portion thereof. Each weighing hopper 6, in a state where the gate 6a and the gate 6b are closed, temporarily stores therein the articles A discharged from the pool hopper 5 corresponding thereto and, by opening the gate 6a or the gate 6b, discharges downward the articles A that have been temporarily stored.

Each booster hopper 7 is arranged below the gate 6a of the respective weighing hoppers 6. Each booster hopper 7 includes a gate 7a that can be opened and closed with respect to the bottom portion thereof. Each booster hopper 7, by closing the gate 7a, temporarily stores therein the articles A discharged from the gate 6a side of the weighing hopper 6 corresponding thereto. Moreover, each booster hopper 7, by opening the gate 7a, discharges downward the articles A that have been temporarily stored.

The collecting chute 8 is formed in a tubular shape having an inner surface 8a of a truncated cone tapering downward. The collecting chute 8 is arranged such that the inner surface 8a is located below all the weighing hoppers 6 and all the booster hoppers 7. The collecting chute 8 receives by the inner surface 8a the articles A that are discharged from the gate 6b side of the respective weighing hoppers 6 and the articles A that are discharged from the respective booster hoppers 7 and discharges the articles A downward.

The timing hopper 9 is arranged below the collecting chute 8. The timing hopper 9 includes a gate 9a that can be opened and closed with respect to the bottom portion thereof. The timing hopper 9, in a state where the gate 9a is closed, temporarily stores therein the articles A discharged from the collecting chute 8 and, by opening the gate 9a, discharges the articles A that have been temporarily stored to the bag-making and packaging machine 60.

The input chute 2, the distributing feeder 3, the radial feeders 4, the pool hoppers 5, and the weighing hoppers 6 are directly or indirectly supported on a case 13. The distance measuring sensors 45, the booster hoppers 7, the collecting chute 8, and the timing hopper 9 are directly or indirectly supported on a frame 12.

The weighing unit 11 is arranged inside the case 13 that is supported by the frame 12. The weighing unit 11 includes a plurality of load cells 11a. Each load cell 11a supports the weighing hopper 6 corresponding thereto. The weighing unit 11, when the articles A are temporarily stored in each weighing hopper 6, weighs a measured value corresponding to the mass of the articles A.

The weighing controller 20 is arranged inside the case 13. The weighing controller 20 includes a central processing unit (CPU), a read only memory (ROM), and a random-access memory (RAM). The weighing controller 20 controls the operation of various units of the combination weighing apparatus 1. Specifically, the weighing controller 20 controls the conveying operation of the distributing feeder 3 and the radial feeders 4, the opening and closing operation of the gate 5a of the respective pool hoppers 5, the opening and closing operation of the gate 6a and the gate 6b of the respective weighing hoppers 6, the opening and closing operation of the gate 7a of the respective booster hoppers 7, the gate 9a of each timing hopper 9, and others.

The combination weighing apparatus 1 are set parameters in controlling these operations (hereinafter referred to as "parameters relating to combination weighing"). Specifically, the weighing controller 20 stores therein the parameters relating to combination weighing. Examples of the parameters to store include parameters stored as initial values. Examples of other parameters include: parameters that are input and set by a worker via an operating unit not depicted or the like. Examples of the parameters relating to combination weighing include the dispersion target mass, power (intensity), and time in the distributing feeder 3; the power (intensity) and time in the radial feeder 4; the opening and closing operation and operation timing in the pool hopper 5, the weighing hopper 6, and the booster hopper 7; and a filter at the time of weighing.

The weighing controller 20 stores therein the measured values weighed by the weighing unit 11, in association with the weighing hopper 6 and/or the booster hopper 7 in which the articles A corresponding to the measured value are stored. Specifically, when the articles A weighed by the weighing unit 11 are stored in the weighing hopper 6, the weighing controller 20 stores therein the measured value weighed by the weighing unit 11 in association with the weighing hopper 6 in which the articles A corresponding to the measured value are stored. When the articles A weighed by the weighing unit 11 were discharged to the booster hopper 7 corresponding to the weighing hopper 6, the weighing controller 20 stores therein the measured value of the articles A weighed by the weighing unit 11 in association with the booster hopper 7 corresponding to the weighing hopper 6.

The weighing controller 20 selects a combination of the measured values from a plurality of the measured values that were weighed by the weighing unit 11 and associated with the weighing hopper 6 and/or the booster hopper 7 such that a total value yields a target measured value. Specifically, the weighing controller 20 selects the combination of the measured values from the measured values output by the weighing unit 11 such that the total value falls within a predetermined range for which the target measured value is a lower limit value. Then, the weighing controller 20 causes the weighing hoppers 6 and/or the booster hoppers 7 corresponding to the combination to discharge the articles A.

Figure 4:
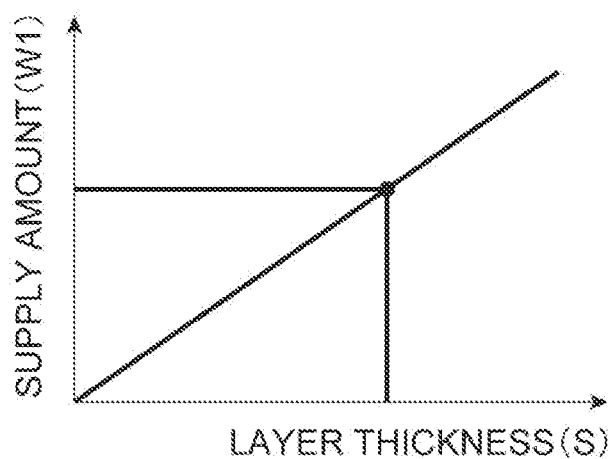
FIG. 4 is a graph illustrating the relation between a layer thickness S and a supply amount W1.

As illustrated in FIG. 4, as the layer thickness S is thicker, the supply amount W1 supplied to the pool hopper 5 (the weighing hopper 6) tends to increase. Thus, the weighing controller 20 controls the conveying power P of the radial feeder 4 depending on the variation in the layer thickness S (see FIG. 3) of the articles A on the trough 4a acquired by the distance measuring sensor 45. More specifically, the weighing controller 20 controls the conveying power P of the radial feeder 4 based on the following Expression 1 that is the relation among the layer thickness S of the articles, the supply amount W1 of the radial feeder 4, and the conveying power P of the radial feeder 4.

$$P = B \times W/S + C \qquad \text{Expression 1}$$

The conveying power P is the amplitude of the vibration of the radial feeder 4. When the value of the conveying power P is small, the amplitude decreases. Thus, the supply amount of the articles A supplied to the weighing hopper 6 (the pool hopper 5) from the radial feeder 4 is reduced. When the value of the conveying power P is large, the amplitude increases. Accordingly, the supply amount of the articles A supplied to the weighing hopper 6 from the radial feeder 4 is increased. As illustrated in FIG. 3, the layer thickness S is the distance between the bottom surface of the trough 4a of the radial feeder 4 and the upper portion of the articles A, near the discharging end of the radial feeder 4. The supply amount W1 is the amount of the articles A supplied to the weighing hopper 6 via the pool hopper 5 from the radial feeder 4.

In the above-described Expression 1, "B" and "C" are each a coefficient. In an initial state of the combination weighing apparatus 1, values empirically obtained according to the configuration of the combination weighing apparatus 1 are given to the coefficient B and the coefficient C as the initial values, for example. The coefficient B and the coefficient C are values that can be changed depending on the shape of the radial feeder 4 and/or the type of the articles. The target supply amount W, the coefficient B, and the coefficient C used in the above-described Expression 1 are also included in the above-described parameters relating to combination weighing.

The weighing controller 20 updates the above-described coefficient B and the coefficient C by learning control. Specifically, the weighing controller 20 sequentially calculates the above-described coefficient B and the coefficient C based on the layer thickness S, the supply amount W1, and the conveying power P continuously acquired from the past. The coefficient B and the coefficient C represent change tendency of the above-described parameter that is generated based on the parameters having been set for the combination weighing apparatus 1 in the past. The weighing controller 20 stores therein the actual supply amount W1 when the conveying power P was controlled so as to obtain the predetermined target supply amount W depending on the layer thickness S, as history information. In this case, the weighing controller 20 stores therein the conveying power P, a value obtained by dividing the supply amount W1 by the layer thickness S (supply amount W1/layer thickness S), and the operating time t of the radial feeder 4, in association with one another. The weighing controller 20 updates the above-described coefficient B and the coefficient C based on such history information.

Based on a plurality of pieces of history information thus stored, the weighing controller 20 calculates the coefficient B and the coefficient C. In this case, the weighing controller 20 calculates the coefficient B and the coefficient C on the assumption that the relation indicated in the above-described Expression 1 holds true for the layer thickness S, the supply amount W1, and the conveying power P. Specifically, the weighing controller 20 derives, based on the history information acquired so far, a new coefficient B and a coefficient C by the least-squares method or the like for each operating time t of the radial feeder 4, for example. When deriving the new coefficient B and the coefficient C, it is possible to set a weight to individual pieces of history information ((the magnitude of the influence when determining the new coefficient B and the coefficient C). For example, for the information closer to the current time, the weight thereof is higher. The coefficient B and the coefficient C are used when determining the current or future conveying power P.

Next, the management server 80 will be described. As illustrated in FIG. 1, the management server 80 mainly includes a display (not depicted), a communication unit 81, a parameter controller (controller) 82, and a receiving unit 83.

The communication unit 81 can yield communication with the combination weighing apparatuses 1. The communication unit 81 is a LAN interface, for example.

The parameter controller 82 is a device that controls the parameters relating to combination weighing that are set for the combination weighing apparatuses 1. The parameter controller 82 is made up of a central processing unit (CPU), a read only memory (ROM) and a random-access memory (RAM) as main memory devices, and a hard disk or a solid-state drive (SSD) in mSATA standard as a sub-memory device, and others.

The parameter controller 82 collects, from the combination weighing apparatuses 1 that are able to perform communication via the communication unit 81 (hereinafter the plurality of combination weighing apparatuses 1 that are able to perform communication via the communication unit 81 are simply referred to as "the combination weighing apparatuses 1"), the parameters relating to combination weighing that are set for the combination weighing apparatuses 1. The parameter controller 82 may collect the parameters by commanding the combination weighing apparatuses 1 to transmit the parameters. The parameter controller 82 may collect the parameters that are continuously or regularly transmitted from the combination weighing apparatuses 1. It is desirable that the timing of collecting the parameters be set appropriately such as for each fixed time, for each weighing operation in the combination weighing apparatus 1, and for each fixed number of weighing operations in the combination weighing apparatus 1.

The parameter controller 82 sets, based on the collected parameters, common parameters (setting parameters) to set in common to the combination weighing apparatuses 1 into a storage unit such as the own RAM. The parameter controller 82 transmits the common parameters to the combination weighing apparatuses 1 and causes the combination weighing apparatuses 1 of the transmission destination to set the common parameters. Whether the parameter controller 82 adopts the parameter acquired from any combination weighing apparatus 1, out of the combination weighing apparatuses 1, as a candidate for the common parameters can be determined by performing any of the following four processes, for example.

The first process is a process based on operating rate information indicative of an operating rate that is a ratio of the number of times the combination weighing has been established to the number of times the combination weighing has been executed. That is, the parameter controller 82 further acquires, in addition to the above-described parameters, the operating rate information from the combination weighing apparatuses 1. The parameter controller 82 determines, with the operating rate as a criterion, whether to adopt the parameter in the combination weighing apparatus 1 that is operating at a predetermined operating rate as a candidate for the common parameters. Specifically, the parameter controller 82 adopts, in preference to the parameter acquired from the combination weighing apparatus 1 for which the operating rate is a first value, the parameter acquired from the combination weighing apparatus 1 for which the operating rate is a second value higher than the first value, as a candidate for the common parameters. Furthermore, the parameter controller 82 preferentially adopts the parameter acquired from the combination weighing apparatus 1 that operates at a higher operating rate, out of the combination weighing apparatuses 1, as a candidate for the common parameters, for example. Moreover, the parameter controller 82 adopts the parameter acquired from the combination weighing apparatus 1 that has the highest operating rate, out of the combination weighing apparatuses 1, as a candidate for the common parameters, for example.

The second process is a process based on the operating rate information, as with the first process. That is, the parameter controller 82 adopts the parameter acquired from the combination weighing apparatus 1 for which the operating rate is greater than or equal to a third value, as a candidate for the common parameters. In other words, the parameter controller 82 adopts the parameter acquired from the combination weighing apparatus 1 that operates at the operating rate greater than or equal to a predetermined threshold value (for example, greater than or equal to 98%), out of the combination weighing apparatuses 1, as a candidate for the common parameters.

The third process can be applied when each of the combination weighing apparatuses 1 determines the parameter set for the combination weighing apparatus 1 in the present or future by using the change tendency of the parameter updated (generated) based on the parameters having been set for the combination weighing apparatus 1 in the past, and is a process based on the depth of learning. The depth of learning is the number of pieces of history information used for updating. That is, the parameter controller 82 further acquires, in addition to the above-described parameters (the coefficient B and the coefficient C), the depth of learning of the parameters from the 213 combination weighing apparatuses 1. The parameter controller 82 determines, with the depth of learning as a criterion, whether to adopt the parameter having the depth of learning, as a candidate for the common parameters. For example, the parameter controller 82 adopts the parameter most deeply learned, out of the parameters (the coefficient B and the coefficient C) acquired from the combination weighing apparatuses 1, as a candidate for the common parameters. The above-described depth of learning may be information including variation in history information, in addition to the number of pieces of the history information used for updating. The variation in history information is information concerning the dispersion of values when the values based on the history information are plotted on a predetermined coordinate space. When the history information is dispersed on the predetermined coordinate space, the learning tends to be deep. Meanwhile, when the history information is concentrated on the predetermined coordinate space, the learning tends to be shallow.

The fourth process is a process based on a degree of deviation between the target supply amount W set for the pool hopper 5 (the weighing hopper 6) that the combination weighing apparatus 1 includes and the supply amount W1 of the articles A actually put into the pool hopper 5 (the weighing hopper 6). That is, the parameter controller 82 further acquires, in addition to the above-described parameters, deviation degree information from the combination weighing apparatuses 1. The parameter controller 82 determines, with the degree of deviation as a criterion, whether to adopt the parameter in the combination weighing apparatus 1 that is operating at the degree of deviation, as a candidate for the common parameters. For example, the parameter controller 82 adopts the parameter acquired from the combination weighing apparatus 1 that operates at a lower degree of deviation, out of the combination weighing apparatuses 1, as a candidate for the common parameters. Furthermore, the parameter controller 82 adopts the parameter acquired from the combination weighing apparatus 1 that has the lowest degree of deviation, out of the combination weighing apparatuses 1, as a candidate for the common parameters, for example.

The parameter controller 82 may be implemented so as to execute any of the above-described first process to the fourth process. The parameter controller 82 may execute the process that is selected (input) by the worker (operator) via the receiving unit 83 that is capable of selecting the first process to the fourth process.

The receiving unit 83 receives various conditions and others of the parameter control that the parameter controller 82 executes. For example, the receiving unit 83 selectively receives the process (the first process to the fourth process) when selecting the candidates for the common parameters from the parameters collected from the combination weighing apparatuses 1.

As in the foregoing, when the parameters are set for at least one combination weighing apparatus 1, the management server 80 of the combination weighing system 100 in the above-described embodiment automatically collects the parameters, determines the common parameters, and causes the combination weighing apparatuses 1 to set the common parameters. Accordingly, the worker can save time and effort for going to and setting the parameters to the individual combination weighing apparatuses. As a result, it is possible to improve the convenience of the worker in setting the parameters relating to combination weighing for the combination weighing apparatuses.

As in the foregoing, one embodiment has been described. However, one aspect of the present disclosure is not limited to the above-described embodiment, and various modifications are possible within a scope not departing from the gist of the disclosure.

In the combination weighing system 100 of the above-described embodiment, an example in which the management server 80 collects the parameters from the combination weighing apparatuses 1 that can be connected via the communication unit 81 has been described. However, the one aspect of the present disclosure is not limited thereto. For example, the parameter controller 82 may have, in place of or in addition to the function of collecting the parameters from the combination weighing apparatuses 1, a function of receiving, via the receiving unit 83, the parameters relating to combination weighing for one or more of the combination weighing apparatuses 1 out of the combination weighing apparatuses 1 that are able to perform communication via the communication unit 81. The receiving unit 83 receives the parameters relating to combination weighing for one or more of the combination weighing apparatuses 1. The receiving unit 83 receives various parameters by an input device such as a keyboard and/or a mouse.

The parameter controller 82 determines, based on the parameters received via the receiving unit 83, the common parameters to set in common to the combination weighing apparatuses 1 for other combination weighing apparatuses 1 different from a specific combination weighing apparatus 1, transmits the set common parameters to the other combination weighing apparatuses 1, and causes the combination weighing apparatuses 1 of the transmission destination to set the common parameters.

In such a combination weighing system 100 according to another embodiment, when the parameters for the specific combination weighing apparatus 1 are received via the receiving unit 83 in the management server 80, and when the parameters are determined to be the common parameters, the other combination weighing apparatuses 1 different from the specific combination weighing apparatus 1 are caused to set the common parameters. Accordingly, the worker can save time and effort for going to and setting the parameters to the individual combination weighing apparatuses 1. As a result, it is possible to improve the convenience of the worker in setting the parameters relating to combination weighing for the combination weighing apparatuses 1.

In such a combination weighing system 100 in the other embodiment, the parameter controller 82 may acquire the operating rate information indicating the operating rate from the specific combination weighing apparatus 1 and, based on the acquired operating rate, may determine whether to adopt the parameter as a candidate for the common parameters. Accordingly, it is possible to determine whether to adopt the parameter as a candidate for the common parameters from the collected parameters based on the operating rate that serves as an index of the quality of the parameter.

Furthermore, in such a combination weighing system 100 in the other embodiment, when the operating rate acquired front a specific combination weighing apparatus 1 is greater than a predetermined value, the parameter controller 82 may adopt the parameter as a candidate for the common parameters. In this case, only the parameter of the combination weighing apparatus 1 that can achieve the operating rate higher than or equal to a certain level is set as a candidate for the common parameters. As a result, it is possible to increase the operating rate of the combination weighing apparatuses 1 that are able to perform communication with one another via the communication unit 81 to a certain value or greater. That is, the processing capacity of the combination weighing apparatuses 1 that are able to perform communication with one another via the communication unit 81 can be maintained at a certain level or higher.

Figure 5:
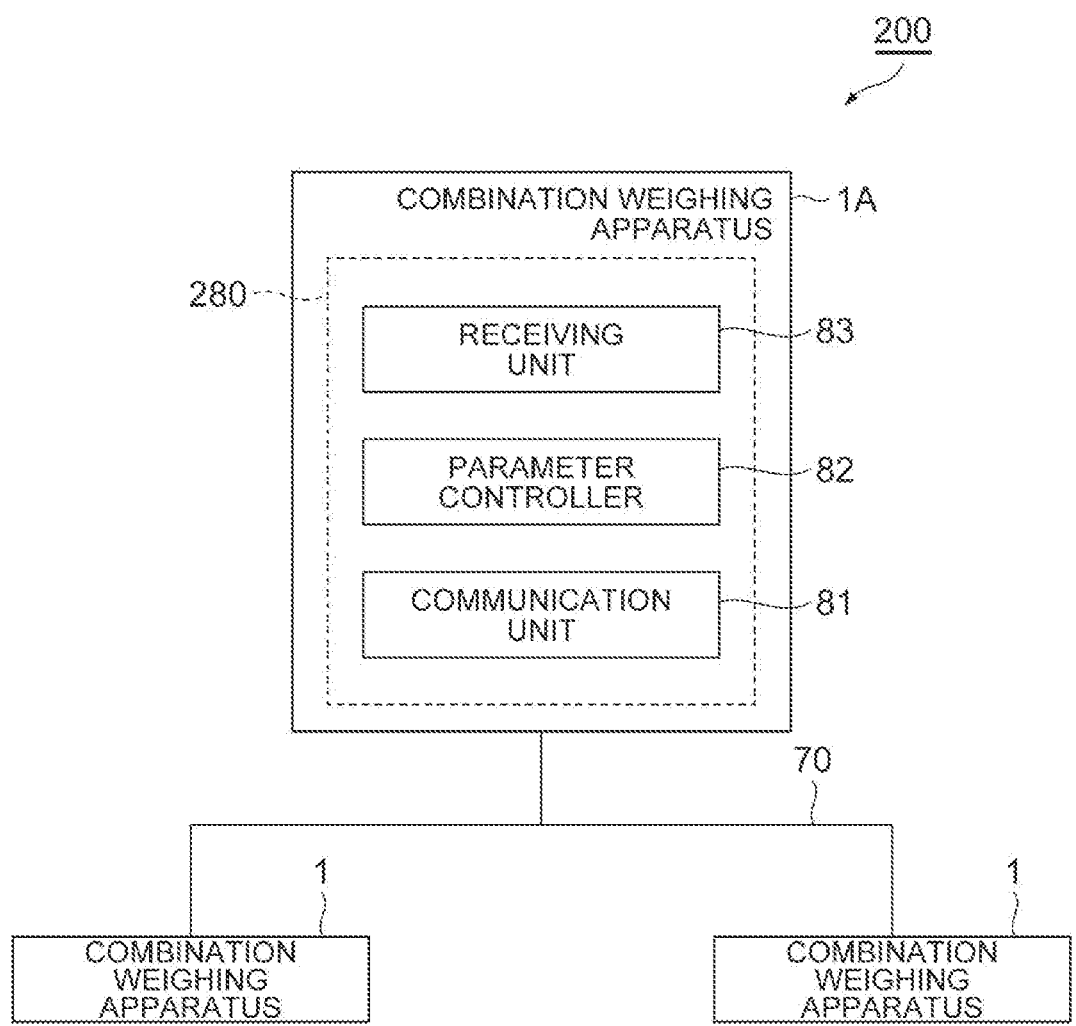
FIG. 5 is a diagram schematically illustrating a configuration of a combination weighing apparatus according to another embodiment.

In the combination weighing system 100 of the above-described embodiment, an example in which the management server 80 that is different from the combination weighing apparatuses 1 collects and distributes the common parameters that are used in common in the combination weighing apparatuses 1 has been described. However, the disclosure is not limited thereto. For example, as illustrated in FIG. 5, a combination weighing system 200 may be configured in which, out of the combination weighing apparatuses 1, at least one combination weighing apparatus 1A includes a control device 280 that exercises the same functions as those of the management server 80 described in the foregoing embodiment.

Even with the combination weighing system 200 of this configuration, as with the combination weighing system 100 in the above-described embodiment, when the parameters are set for at least one combination weighing apparatus 1, the parameters are automatically collected, the common parameters are determined, and the combination weighing apparatuses 1 are caused to set the common parameters. As a result, it is possible to improve the convenience of the worker in setting the parameters relating to combination weighing for the combination weighing apparatuses 1 (1A).

In the above-described embodiment or the modifications, as one example of the detector, the optical distance measuring sensor 45 has been described. However, it may be a camera or the like.

In the above-described embodiment or the modifications, an example in which one each of the distance measuring sensor 45 corresponding to each radial feeder 4 is provided has been described. However, a plurality of distance measuring sensors 45 may be provided along the conveying direction of the radial feeder 4. Accordingly, the layer thickness S of the articles can be detected at a plurality of locations. Thus, the radial feeder 4 can be controlled based on an overall state of the articles A conveyed by the radial feeder 4.

In the above-described embodiment or the modifications, as an example of the conveying unit, the above-described distributing feeder 3 and the radial feeders 4 have been exemplified. However, the disclosure is not limited thereto, and it may be any conveying unit having the configuration capable of conveying articles. For example, a coil unit (screw) that can be rotationally driven, or a belt conveyor may be arranged. In the case of a coil unit, the weighing controller 20 controls, as the conveying power P, the number of revolutions (rpm) or the like of the coil unit. In the case of a belt conveyor, the weighing controller 20 controls the number of revolutions and the like of a roller that drives the belt.

In the above-described embodiment or the modifications, as an example of the acquisition unit capable of acquiring, from a plurality of combination weighing apparatuses, the parameters relating to combination weighing that are set for the combination weighing apparatuses, the communication unit 81 (for example, a LAN interface) that can yield communication with the combination weighing apparatuses 1 has been exemplified. However, the disclosure is not limited thereto. For example, in place of the communication unit, a device capable of reading a portable recording medium on which the above-described parameters are stored may be included.

In the above-described embodiment or the modifications, an example in which the parameters set by the parameter controller 82 are set in common to all the combination weighing apparatuses 1 that are able to perform communication via the communication unit 81 has been exemplified. However, the disclosure is not limited thereto. For example, the parameter controller 82 may transmit the parameters that are set by the parameter controller 82 to some of the combination weighing apparatuses 1 that are able to perform communication via the communication unit 81, and cause the combination weighing apparatuses 1 of the transmission destination to set the parameters.

In the above-described embodiment or the modifications, an example in which the parameters set by the parameter controller 82 are set as is to all the combination weighing apparatuses 1 that are able to perform communication via the communication unit 81 has been exemplified. However, the disclosure is not limited thereto. The parameter controller 82 may transmit generated parameters to the combination weighing apparatuses 1 that are able to perform communication via the communication unit 81, after having added a partial modification to the generated parameters.

In the above-described embodiment, as an example of a plurality of hoppers, the annularly arranged weighing hoppers 6 and the booster hoppers 7 have been exemplified. However, the disclosure is not limited thereto, and the hoppers may be placed in a matrix. Furthermore, as the plurality of hoppers, it may be of a configuration in which no booster hoppers 7 are provided.

The control device for combination weighing apparatuses according to one aspect of the present disclosure includes: the communication unit configured to perform communication with a plurality of combination weighing apparatuses; and the controller configured to collect parameters relating to combination weighing that are set for the combination weighing apparatuses from the combination weighing apparatuses that are able to perform communication via the communication unit, to determine, based on the collected parameters, common parameters to set in common to the combination weighing apparatuses that are able to perform communication via the communication unit, to transmit the common parameters to the combination weighing apparatuses that are able to perform communication via the communication unit, and to cause the combination weighing apparatuses of transmission destinations to set the common parameters.

The control device for combination weighing apparatuses in one aspect of the present disclosure includes: the communication unit configured to perform communication with a plurality of combination weighing apparatuses; the receiving unit configured to receive parameters relating to combination weighing for a specific combination weighing apparatus among the combination weighing apparatuses that are able to perform communication via the communication unit; and the controller configured to determine, based on the parameters received via the receiving unit, common parameters to set in common to the combination weighing apparatuses for other combination weighing apparatuses different from the specific combination weighing apparatus, to transmit the set common parameters to the other combination weighing apparatuses, and to cause the combination weighing apparatuses of transmission destinations to set the common parameters.

REFERENCE SIGNS LIST

1, 1A COMBINATION WEIGHING APPARATUS
3 DISTRIBUTING FEEDER (CONVEYING UNIT)
4 RADIAL FEEDER (CONVEYING UNIT)
5 POOL HOPPER (HOPPER)
6 WEIGHING HOPPER (HOPPER)
7 BOOSTER HOPPER (HOPPER)
11 WEIGHING UNIT
20 WEIGHING CONTROLLER
45 DISTANCE MEASURING SENSOR
80 MANAGEMENT SERVER (CONTROL DEVICE. FOR COMBINATION WEIGHING APPARATUSES)
81 COMMUNICATION UNIT
82 PARAMETER CONTROLLER (CONTROLLER)
83 RECEIVING UNIT
100, 200 COMBINATION WEIGHING SYSTEM
280 CONTROL DEVICE (CONTROL DEVICE FOR COMBINATION WEIGHING APPARATUSES)
A ARTICLES
B, C COEFFICIENT (PARAMETER)

The invention claimed is:

1. A control device for combination weighing apparatuses comprising:
   an acquisition unit capable of acquiring, from a plurality of combination weighing apparatuses, parameters relating to combination weighing that are set for the combination weighing apparatuses; and
   a controller configured to collect the parameters from some of the combination weighing apparatuses from which acquiring the parameters via the acquisition unit is possible, to generate, based on the collected parameters, setting parameters to set for some other of the combination weighing apparatuses among the combination weighing apparatuses from which acquiring via the acquisition unit is possible, and to transmit the setting parameters to the some other of the combination weighing apparatuses from which acquiring via the acquisition unit is possible, wherein
   the some other of the combination weighing apparatuses among the combination weighing apparatuses from which acquiring via the acquisition unit is possible includes combination weighing apparatuses different from the some of the combination weighing apparatuses from which the controller collects the parameters.

2. The control device for combination weighing apparatuses according to claim 1, wherein
the acquisition unit is a communication unit capable of performing communication with the combination weighing apparatuses, and
the controller collects parameters relating to combination weighing that are set for the some of the combination weighing apparatuses from the combination weighing apparatuses that are able to perform communication via the communication unit, generates, based on the collected parameters, setting parameters to set for the some other of the combination weighing apparatuses among the combination weighing apparatuses that are able to perform communication via the communication unit, and transmits the setting parameters to the some other of the combination weighing apparatuses that are able to perform communication via the communication unit.

3. A control device for combination weighing apparatuses comprising:
an acquisition unit capable of acquiring, from a plurality of combination weighing apparatuses, parameters relating to combination weighing that are set for the combination weighing apparatuses;
a receiving unit configured to receive parameters relating to combination weighing for a specific combination weighing apparatus among the combination weighing apparatuses from which acquiring the parameters via the acquisition unit is possible; and
a controller configured to generate, based on the parameters received via the receiving unit, setting parameters to set for the combination weighing apparatuses from which acquiring via the acquisition unit is possible, for other combination weighing apparatuses different from the specific combination weighing apparatus, and to transmit the setting parameters to the other combination weighing apparatuses.

4. The control device for combination weighing apparatuses according to claim 3, wherein
the acquisition unit is a communication unit configured to perform communication with the combination weighing apparatuses,
the receiving unit receives parameters relating to combination weighing for a specific combination weighing apparatus among the combination weighing apparatuses that are able to perform communication via the communication unit, and
the controller determines, based on the parameters received via the receiving unit, setting parameters to set for the combination weighing apparatuses being able to perform communication via the communication unit for other combination weighing apparatuses different from the specific combination weighing apparatus, and transmits the setting parameters to the other combination weighing apparatuses.

5. The control device for combination weighing apparatuses according to claim 1, wherein the controller acquires, from the some of the combination weighing apparatuses from which acquiring the parameters via the acquisition unit is possible, operating rate information indicating an operating rate that is a ratio of number of times the combination weighing was established to number of times the combination weighing was executed, and determines, with the operating rate as a criterion, whether to adopt the parameter of a combination weighing apparatus operating at a predetermined operating rate as a candidate for the setting parameters.

6. The control device for combination weighing apparatuses according to claim 5, wherein the controller adopts, in preference to a parameter acquired from a combination weighing apparatus for which the operating rate is a first value, a parameter acquired from a combination weighing apparatus for which the operating rate is a second value higher than the first value, as a candidate for the setting parameters.

7. The control device for combination weighing apparatuses according to claim 6, wherein the controller adopts a parameter acquired from a combination weighing apparatus for which the operating rate is greater than a third value that is a predetermined threshold value, as a candidate for the setting parameters.

8. The control device for combination weighing apparatuses according to claim 3, wherein the controller acquires, from the specific combination weighing apparatus, operating rate information indicating an operating rate that is a ratio of number of times the combination weighing was established to number of times the combination weighing was executed, and determines, based on the acquired operating rate, whether to adopt the parameter as a candidate for the setting parameters.

9. The control device for combination weighing apparatuses according to claim 8, wherein the controller adopts the parameter as a candidate for the setting parameters when the operating rate acquired from the specific combination weighing apparatus is greater than a predetermined value.

10. The control device for combination weighing apparatuses according to claim 1, wherein
each of the combination weighing apparatuses determines the parameter to set for the combination weighing apparatus by using a change tendency of the parameter generated based on the parameters having been set in the combination weighing apparatus in the past, and
the controller acquires, from the some of the combination weighing apparatuses from which acquiring the parameters via the acquisition unit is possible, numerical information concerning number of the parameters used in generating the change tendency of the parameter, and determines, with the acquired numerical information as a criterion, whether to adopt the parameter of the combination weighing apparatus corresponding to the numerical information as a candidate for the setting parameters.

11. The control device for combination weighing apparatuses according to claim 1, wherein the controller acquires, from the some of the combination weighing apparatuses from which acquiring the parameters via the acquisition unit is possible, supply information based on a target supply amount W to be set for a hopper that each of the combination weighing apparatuses includes and a supply amount W1 of articles actually put into the hopper and, when it is determined that deviation between the target supply amount W and the supply amount W1 is within a predetermined threshold value based on the acquired supply information, adopts, as a candidate for the setting parameters, the parameter of the combination weighing apparatus that is the acquisition source of the supply information served as a subject of the determination.

12. A combination weighing apparatus comprising:
a conveying unit configured to convey articles;
a plurality of hoppers configured to temporarily store therein the articles conveyed by the conveying unit;

a weighing unit configured to weigh a measured value corresponding to a mass of the articles stored in the hopper;

a weighing controller configured to select a combination of the measured values from a plurality of the measured values that are weighed by the weighing unit and associated with the hoppers such that a total value yields a target measured value, and to cause the hoppers that are associated with the combination to discharge the articles; and the control device for combination weighing apparatuses according to claim 1.

13. A combination weighing apparatus system comprising:

a plurality of combination weighing apparatuses; and the control device for combination weighing apparatuses according to claim 1, wherein each of the combination weighing apparatuses includes a conveying unit configured to convey articles, a plurality of hoppers configured to temporarily store therein the articles conveyed by the conveying unit, a weighing unit configured to weigh a measured value corresponding to a mass of the articles stored in the hopper, and a weighing controller configured to select a combination of the measured values from a plurality of the measured values that are weighed by the weighing unit and associated with the hoppers such that a total value yields a target measured value, and to cause the hoppers that are associated with the combination to discharge the articles.

14. The control device for combination weighing apparatuses according to claim 3, wherein each of the combination weighing apparatuses determines the parameter to set for the combination weighing apparatus by using a change tendency of the parameter generated based on the parameters having been set in the combination weighing apparatus in the past, and the controller acquires, from the combination weighing apparatuses from which acquiring the parameters via the acquisition unit is possible, numerical information concerning number of the parameters used in generating the change tendency of the parameter, and determines, with the acquired numerical information as a criterion, whether to adopt the parameter of the combination weighing apparatus corresponding to the numerical information as a candidate for the setting parameters.

15. The control device for combination weighing apparatuses according to claim 3, wherein the controller acquires, from the combination weighing apparatuses from which acquiring the parameters via the acquisition unit is possible, supply information based on a target supply amount W to be set for a hopper that each of the combination weighing apparatuses includes and a supply amount W1 of articles actually put into the hopper and, when it is determined that deviation between the target supply amount W and the supply amount W1 is within a predetermined threshold value based on the acquired supply information, adopts, as a candidate for the setting parameters, the parameter of the combination weighing apparatus that is the acquisition source of the supply information served as a subject of the determination.

16. A combination weighing apparatus comprising:

a conveying unit configured to convey articles;

a plurality of hoppers configured to temporarily store therein the articles conveyed by the conveying unit;

a weighing unit configured to weigh a measured value corresponding to a mass of the articles stored in the hopper;

a weighing controller configured to select a combination of the measured values from a plurality of the measured values that are weighed by the weighing unit and associated with the hoppers such that a total value yields a target measured value, and to cause the hoppers that are associated with the combination to discharge the articles; and the control device for combination weighing apparatuses according to claim 3.

17. A combination weighing apparatus system comprising:

a plurality of combination weighing apparatuses; and the control device for combination weighing apparatuses according to claim 1, wherein each of the combination weighing apparatuses includes a conveying unit configured to convey articles, a plurality of hoppers configured to temporarily store therein the articles conveyed by the conveying unit, a weighing unit configured to weigh a measured value corresponding to a mass of the articles stored in the hopper, and a weighing controller configured to select a combination of the measured values from a plurality of the measured values that are weighed by the weighing unit and associated with the hoppers such that a total value yields a target measured value, and to cause the hoppers that are associated with the combination to discharge the articles.

18. The control device for combination weighing apparatuses according to claim 3, wherein the controller is further configured to generate, based on the parameters received via the receiving unit, setting parameters to set for the specific combination weighing apparatus.

* * * * *